Jan. 31, 1956     G. B. ANTHONISEN     2,733,013
TRACK CONSTRUCTION
Filed June 23, 1952
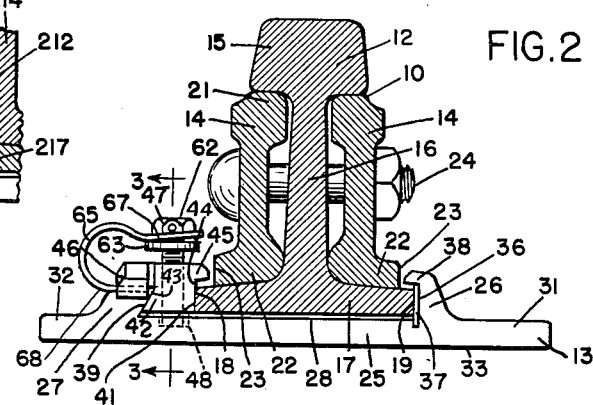
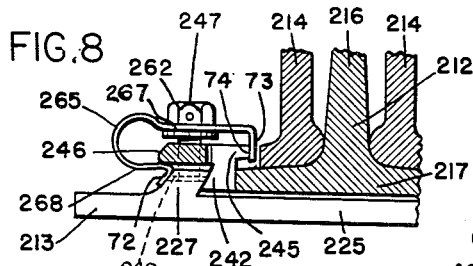
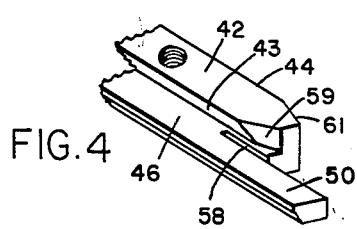
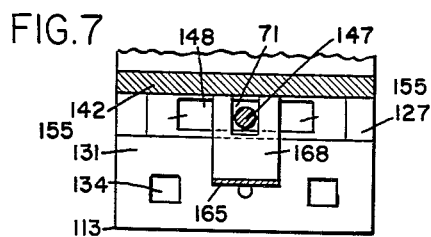
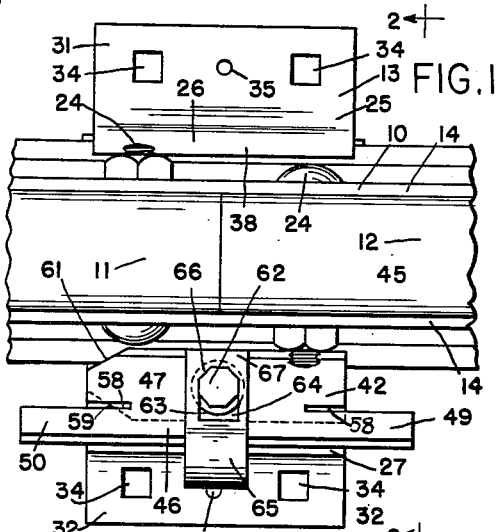
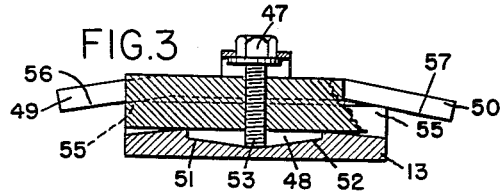
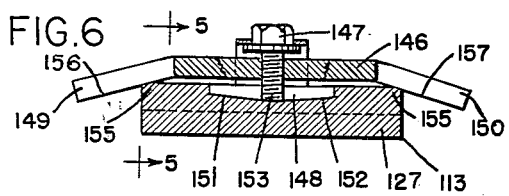
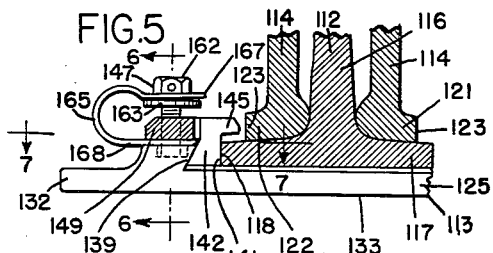
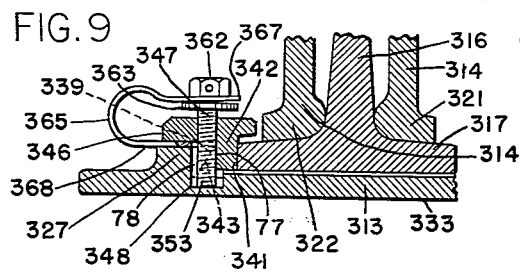
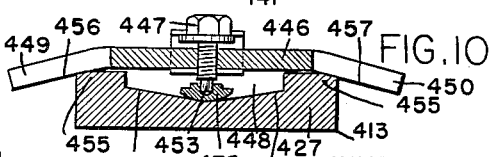
INVENTOR
GEORG BROOKMAN ANTHONISEN
BY Caswell & Lagaard
ATTORNEYS

United States Patent Office 2,733,013
Patented Jan. 31, 1956

2,733,013

TRACK CONSTRUCTION

Georg Brookman Anthonisen, St. Paul, Minn.

Application June 23, 1952, Serial No. 295,008

25 Claims. (Cl. 238—317)

The herein disclosed invention relates to track construction and has for an object to provide a track construction in which the rails are rigidly secured together.

Another object of the invention resides in providing a track construction in which creeping of the rails is materially restrained.

Another object of the invention resides in providing a tie plate by means of which the ends of adjoining rails are supported and held in alignment and in further providing in conjunction with said tie plate means whereby creeping of the rails is restrained.

Another object of the invention resides in constructing the tie plate with spaced abutments between which the bases of the rails are disposed, one of said abutments having a beveled face directed toward the edge of the bases of the rails and forming a dovetailed groove in which a dovetailed key may be inserted, said key operating to clamp the bases of the rails against the adjoining abutment upon upward movement of said key.

An object of the invention resides in providing the key and tie plate with juxtaposed parts, one of said parts having a longitudinally extending inclined cam surface and the other having a cam follower for engagement therewith and serving to raise the key with respect to said beveled surface upon longitudinal movement of the key to grip the bases and restrain creeping of the rails.

Another object of the invention in one form thereof resides in forming the cam on the tie plate and the follower on the key.

A feature of the invention resides in constructing the tie plate with a groove having an inclined bottom surface and in providing a screw screwed into the key and engaging said surface of the groove.

A still further object of the invention resides in providing a U-shaped locking member engaging the screw and the key and restraining rotation of the screw relative to the key.

Other objects of the invention reside in the novel combination and arrangement of parts and in the details of construction hereinafter illustrated and/or described.

In the drawings:

Fig. 1 is a plan view of a portion of a track at the joint between adjacent rails and illustrating an embodiment of the invention.

Fig. 2 is a cross sectional view taken on line 2—2 of Fig. 1.

Fig. 3 is a longitudinal sectional view taken on line 3—3 of Fig. 2.

Fig. 4 is a perspective view of a portion of the key used with the invention.

Fig. 5 is a fragmentary view similar to Fig. 2 and illustrating a modification of the invention, said view being taken on line 5—5 of Fig. 6.

Fig. 6 is a longitudinal sectional view taken on line 6—6 of Fig. 5.

Fig. 7 is a plan sectional view taken on line 7—7 of Fig. 5.

Fig. 8 is a view similar to Fig. 5 of still another form of the invention.

Fig. 9 is a fragmentary view similar to Fig. 2 and showing still another form of the invention.

Fig. 10 is a view similar to Fig. 6 of another modification of the invention.

In the drawings a rail joint has been shown together with the ends of two adjacent rails. These rails are secured together by means of splice bars and rest upon a tie plate which is formed with spaced parallel abutments. One of the abutments has a beveled face spaced from one of the edges of the bases of the rails to form a dovetailed groove therebetween. In this groove is mounted a dovetailed key which upon upward movement forces the adjoining surface of the key against said edge of the bases of the rails and urges the same toward the other abutment. This key is formed with a flange overlying the abutment. In one form of the invention a groove is provided in the body portion of the tie plate having oppositely inclined longitudinally extending cam surfaces. A screw screwed into the key extends into this groove and engages the cam surfaces and is adapted upon longitudinal movement of the key in either direction to force the key upwardly and to grip the bases of the rails and reduce creeping of the rails. This screw is formed with a polygonal head having a flange at the lower end of the same. Engaging said flange and the flange on the key is a U-shaped locking member which prevents rotation of the screw relative to the key. In another form of the invention the groove is formed in the abutment having the beveled face and the screw extends through the flange of the key.

For the purpose of illustrating the application of the invention a rail joint has been shown in the drawing which is designated in its entirety by the reference numeral 10. The rail joint is used to connect two rails 11 and 12 together and comprises a tie plate 13 and splice bars 14 connected thereto.

The rails 11 and 12 being similar in construction, only the rail 12 will be described in detail. This rail consists of a head 15 on which the wheels of the rolling stock carried by the track travel and a web 16 connected thereto. The web 16 issues upwardly from a base 17 which is of a suitable width to give the desired strength to the rail. The base has two lateral edges 18 and 19 and by means of which the rails are clamped in position.

The splice bars 14 are of ordinary construction and have ribs 21 which engage the under surfaces of the head 10 and other ribs 22 which engage the upper surface of the bases 17. Bolts 24 extending through the said splice bars and the webs 16 of the rails secure the parts together. The outer edges 23 of the ribs 22 of said splice bars fall short of the edges 18 and 19 of the bases 17 for a purpose which will presently become apparent.

The tie plate 13 comprises a plate-like body portion 25 which is of suitable length and of a width considerably greater than the width of the rail bases 17. This body portion has issuing upwardly from it two spaced abutments 26 and 27 which are disposed apart a distance greater than the width of the rail bases 17 and which are disposed inwardly from the lateral edges of the tie plate to provide an intervening portion 28 on which the rails rest and marginal portions 31 and 32 by means of which the tie plate may be secured to the tie. The under surface 33 of the tie plate is preferably planiform and rests directly upon the tie. The upper surface of the tie plate is relieved slightly at its ends to reduce the strain on the rail when the rolling stock moves over the joint. For attaching the tie plate to the ties, spikes are driven through square holes 34 in the marginal portions 31 and 32 of the plate-like body portion 25. Additional round holes 35 are provided therein and through which nails may be driven into the ties to hold the tie plates in position prior to the driving of the spikes into the same.

The edge 19 of the rail base 17 is adapted to extend substantially up to a vertical shoulder 36 formed on the abutment 26. A shim 37 is disposed between this shoulder and the edge 19 and may be varied in thickness or omitted to accommodate different widths of rail bases. The abutment 26 has a lip 38 which overhangs the rail base 17 and which prevents disengagement of the edge 19 from the shim 37 or the shoulder 36.

The abutment 27 is spaced from the edge 18 of the rail base 17 and has a beveled face 39 forming with the edge 18 of rail base 17 a dovetailed groove 41. This face forms another shoulder facing the edge 18 of the rail base. Insertable into the groove 41 is a key 42 which has a beveled surface 43 adapted to engage the beveled face 39 of abutment 27 and a vertical surface 44 adapted to engage the edge 18 of rail base 17. Extending inwardly from the surface 44 is a lip 45 similar to the lip 38, and which serves the same purpose. Extending in the opposite direction from the lip 45 is a flange 46 which overlies the abutment 27.

In the form of the invention shown in Figs. 1, 2 and 3 a cap screw 47 is employed which is screwed into the key 42 and projects below the lower surface of the same. This screw enters into a groove 48 formed on the body portion 25 of tie plate 13 and best shown in Fig. 3. The said groove has two inclined longitudinally extending cam surfaces 51 and 52 which incline upwardly from the center of the groove. The end 53 of the screw 47 engages these surfaces and serves as a cam follower. As the screw 47 is screwed down the same urges the key 42 upwardly, the surface 43 of said key sliding along the beveled face 39 of abutment 27 causing the key to rise and the surface 44 thereof to be urged tightly against the edge 18 of the rail bases.

The flange 46 of the key 42 is constructed with extensions 49 and 50 which project outwardly beyond the extreme ends 55 of the abutment 27. These extensions are bent downwardly as shown in Fig. 3 to form cam surfaces 56 and 57 on the undersides thereof. These cam surfaces are adapted to engage the ends 55 of abutment 27, which are beveled and which serve as cam followers. The said extensions are separated from the key proper by means of kerfs 58, as best shown in Fig. 4, to facilitate bending of the said extensions. The extensions 49 and 50 are preferably bent in the field, or if desired, one may be bent in the shop and the other bent in the field. The cam followers 55, in addition to the cam followers 53, cause key 42 to move upwardly when the key is moved in a longitudinal direction. If, for example, the key is being moved to the right as viewed in Fig. 3, the end 53 of screw 47 will travel upwardly along the cam surface 52 and the cam surface 56 of extension 49 will travel upwardly along the contacting surface of the corresponding cam follower 55. Thus the key travels upwardly in substantial parallelism with the tie plate and the surface 44 thereof is driven inwardly against the edges 18 of the rail bases. This action firmly grips the rail bases and restrains creeping of the rails.

To facilitate insertion of the key into the groove 41, the end of the key, as best shown in Fig. 4, is made pointed. This is accomplished by providing a cut 59 diagonally across the face 43 of said key and another cut 61 diagonally across the shoulder 44 and the lip 43 of said key.

The screw 47 is formed with an octagonal head 62 terminating in an annular flange 63 at the lowermost portion of said head. The head 62 is received in an opening 64 in the upper leg 67 of a U-shaped or looped spring locking member 65. The upper leg 67 of this locking member engages the upper surface of flange 63 and the lower leg 68 of said locking member engages the under surface of the flange 46 of key 42. The opening 64 is octagonal at the innermost edge thereof as indicated at 66 to fit the sides of the head 62 and is rectangular at its outermost portion and free from the head. This is for the purpose of facilitating application of the locking member to the head of the screw.

In Figs. 5, 6 and 7 has been shown a modification of the invention in which the screw is applied to the flange of the key and the cam surfaces formed on the abutment of the tie plate. Due to the similarity of the parts, the description of the corresponding parts will not be repeated, and the same reference numerals preceded by the digit "1" will be used to designate the corresponding parts. In this form of the invention the groove 148 is formed in the abutment 127 instead of the body portion 125 of the tie plate 113. Likewise, the screw 147 is screwed into the flange 146 instead of into the key proper. In operation the end 153 of the cap screw 147 rides along the cam surfaces 151 and 152, the same as in the other form of the invention. Similar cam surfaces 156 and 157 on extensions 149 and 150 ride along the cam followers 155. In this particular construction, the leg 168 of the locking member 165 is formed with a slot 71 which receives the shank of the cap screw 147 and permits of applying the locking member after adjustment of the screw 147.

In Fig. 8 a different form of locking device is shown for holding the cap screw from rotation. Inasmuch as the construction shown in Fig. 8 is similar to that disclosed in Figs. 1 and 2, the same reference numbers as used in Figs. 1 and 2 preceded by the digit "2" will be used to designate corresponding parts. In this form of the invention the flange 246 is constructed with a considerable overhang beyond the abutment 227. The leg 268 of locking member 265 is formed with a catch 72 which is adapted to engage under the overhang of said flange. The upper leg 267 of said locking member is formed with a depending finger 73 which engages the edge 74 of the lip 245 of key 242. Instead of an irregular shaped hole such as the hole 66 used in conjunction with the head 62 of screw 47, a regular shaped hole completely engaging all of the sides of the head 262 of cap screw 247 is employed. In the application of this lock member, the same is slipped over the head 262 with the finger 73 engaging the surface 74 of lip 245. Catch 72 is then sprung under the overhanging portion of flange 246. If desired, the groove 248 may extend completely across the abutment 227 as shown in Fig. 8.

In Fig. 9 still another form of the invention has been shown. The construction illustrated in Fig. 9 is quite similar to that shown in Fig. 2 and the description thereof will not be repeated but the same reference numerals preceded by the digit "3" will be used to designate the corresponding parts. In this form of the invention the screw 347 passes through the beveled face 339 of abutment 327 and through the surface 43 of key 342. To accommodate said screw the key 342 has a notch 77 in the edge of the same and through which said screw passes. Likewise, the abutment 327 has an elongated recess 78 in the same and in which said screw is disposed. Groove 348 lies beneath the recess 78 and receives the end 353 of said screw. With this form of the invention the force exerted on the key through creeping of the rails is directed at the beveled surfaces between the key and abutment and no appreciable movement is produced tending to twist the key.

In Fig. 10 another modification of the invention has been shown. The construction therein illustrated being quite similar to that shown in Fig. 6, the description thereof will not be repeated but the same reference numerals preceded by the digit "4" will be used to designate the corresponding parts. In this form of the invention the groove 448 is formed in the abutment and extends completely across the abutment. Also the said groove is somewhat deeper than the groove 148. Slidably mounted in the said groove is a shoe 475 which is engaged by the end 453 of screw 447. This shoe increases the bearing surface between the said screw and the cam surfaces 451 and 452 and thereby reduces wear on the end of the screw and the cam surface.

The manner of using the invention is obvious. The tie plates are properly set on the ties and fastened down with nails through the holes 35. The rails are then placed on the tie plates with the edges 19 of the rails against the shims 37 or the shoulder 36 of abutment 26. The keys 42 with the screws 47 screwed up are next applied by inserting the sharpened end of said keys into the groove 41. When the keys are centered screws 47 are tightened down into the grooves 48 or 148, as the case may be, until the key is moved sufficiently upward to grip the edge 18 of the rail bases. The locking members 65 are then applied as described. The extensions 49 and 50 are next bent down to form the cam surfaces 56 and 57. It will readily be comprehended that with the parts so arranged, any creeping of the rails which would cause longitudinal movement of the keys would cause the said keys to move upward through the action of the cams 56 or 57 with the cam followers 55 and the end 53 of screw 47 with the corresponding cams 51 and 52.

The advantages of the invention are manifest. The rails are held in perfect alignment and longitudinal movement thereof resisted through action of the keys. The installation is extremely simple and the rails can be laid and applied extremely rapidly. With the invention the rails are maintained in alignment and creeping of the same is greatly reduced.

Changes in the specific form of the invention, as herein described, may be made within the scope of what is claimed without departing from the spirit of the invention.

Having described the invention, what is claimed as new and desired to be protected by Letters Patent is:

1. A tie plate for application to the base of a rail comprising a body portion on which the rail rests, two parallel abutments extending upwardly therefrom and between which the base of the rail is disposed, one of said abutments being spaced from the juxtaposed edge of the rail base and being constructed with a beveled face to form a dovetailed groove therebetween, a key having a dovetailed tongue received in said groove, the minimum distance between said face and the juxtaposed edge of the rail base being less than the maximum thickness of said tongue to prevent disengagement of the tongue therefrom upon upward movement of the key, said key and tie plate having engageable parts, a longitudinally extending cam surface on one of said parts inclining in the direction of its length, and a cam follower on the other of said parts engageable with said cam surface and causing upward movement of said key to grip the rail base and restrain creeping thereof in one direction upon longitudinal movement of the key in such direction.

2. A tie plate for application to the base of a rail comprising a body portion on which the rail rests, two parallel abutments extending upwardly therefrom and between which the base of the rail is disposed, one of said abutments being spaced from the juxtaposed edge of the rail base and being constructed with a beveled face to form a dovetailed groove therebetween, a key having a dovetailed tongue received in said groove, the minimum distance between said face and the juxtaposed edge of the rail base being less than the maximum thickness of said tongue to prevent disengagement of the tongue therefrom upon upward movement of the key, said key and tie plate having engageable parts, a longitudinally extending cam surface on one of said parts inclining in the direction of its length, a cam follower on the other of said parts engageable with said cam surface and causing upward movement of said key to grip the rail base and restrain creeping thereof in one direction upon longitudinal movement of the key in such direction, a second longitudinally extending cam surface on one of said parts inclining in the direction of its length and spaced in a longitudinal direction from said first named cam surface; and a second cam follower on the other of said parts engageable with said second cam surface, said second cam surface inclining in a direction opposite to that of said first cam surface to cause upward movement of said key to grip the rail base and restrain creeping thereof in the other direction upon longitudinal movement of the key in the second named direction.

3. A tie plate for application to the base of a rail comprising a body portion on which the rail rests, two parallel abutments extending upwardly therefrom and between which the base of the rail is disposed, one of said abutments being spaced from the juxtaposed edge of the rail base and being constructed with a beveled face to form a dovetailed groove therebetween, a key having a dovetailed tongue received in said groove, the minimum distance between said face and the juxtaposed edge of the rail base being less than the maximum thickness of said tongue to prevent disengagement of the tongue therefrom upward movement of the key, said tie plate having a longitudinally extending cam surface inclining in the direction of its length and a cam follower on said key engageable with said cam surface and causing upward movement of said key to grip the rail base and restrain creeping thereof in one direction upon longitudinal movement of the key in such direction.

4. A tie plate for application to the base of a rail comprising a body portion on which the rail rests, two parallel abutments extending upwardly therefrom and between which the base of the rail is disposed, one of said abutments being spaced from the juxtaposed edge of the rail base and being constructed with a beveled face to form a dovetailed groove therebetween, a key having a dovetailed tongue received in said groove, the minimum distance between said face and the juxtaposed edge of the rail base being less than the maximum thickness of said tongue to prevent disengagement of the tongue therefrom upon upward movement of the key, said tie plate having a longitudinally extending cam surface inclining in the direction of its length, a cam follower on said key engageable with said cam surface and causing upward movement of said key to grip the rail base and restrain creeping thereof in one direction upon longitudinal movement of the key in such direction, a second longitudinally extending inclined cam surface on said tie plate and a cam follower on said key engageable with said second cam surface, said second cam inclining in a direction to cause upward movement of said key to grip the rail base and restrain creeping thereof in the other direction upon longitudinal movement of the key in the second named direction.

5. A tie plate for application to the base of a rail comprising a body portion on which the rail rests, two parallel abutments extending upwardly therefrom and between which the base of the rail is disposed, one of said abutments being spaced from the juxtaposed edge of the rail base and being constructed with a beveled face to form a dovetailed groove therebetween, a key having a dovetailed tongue received in said groove, the minimum distance between said face and the juxtaposed edge of the rail base being less than the maximum thickness of said tongue to prevent disengagement of the tongue therefrom upon upward movement of the key, a longitudinally extending groove in said tie plate and having a longitudinally inclined cam surface therein and a screw screwed into said key and engageable with said cam surface and causing upward movement of said key in a longitudinal direction to grip the rail base and restrain creeping thereof in one direction upon longitudinal movement of the key in such direction.

6. A tie plate for application to the base of a rail comprising a body portion on which the rail rests, two parallel abutments extending upwardly therefrom and between which the base of the rail is disposed, one of said abutments being spaced from the juxtaposed edge of the rail base and being constructed with a beveled face to form a dovetailed groove therebetween, a key having a dovetailed tongue received in said groove, the minimum distance between said face and the juxtaposed edge of the rail base being less than the maximum thickness of said tongue to prevent disengagement of the tongue therefrom upon upward movement of the key, a longitudinally extending groove in said tie plate and having two oppositely directed longitudinally extending inclined cam surfaces therein and a screw screwed into said key and being alternately engageable with said cam surfaces to cause upward movement of said key upon longitudinal movement of the key in either direction to grip the rail base and restrain creeping thereof in the corresponding direction of movement.

7. A tie plate for application to the base of a rail comprising a body portion on which the rail rests, two parallel abutments extending upwardly therefrom and between which the base of the rail is disposed, one of said abutments being spaced from the juxtaposed edge of the rail base and being constructed with a beveled face to form a dovetailed groove therebetween, a key having a dovetailed tongue received in said groove, the minimum distance between said face and the juxtaposed edge of the rail base being less than the maximum thickness of said tongue to prevent disengagement of the tongue therefrom upon upward movement of the key, a longitudinally extending groove in said tie plate and having an inclined cam surface therein, a screw screwed into said key and engageable with said cam surface and causing upward movement of said key to grip the rail base and restrain creeping thereof in one direction upon longitudinal movement of the key in such direction, a U-shaped locking member engaging a part of said screw and a part of said key and restraining rotational movement of said screw.

8. A tie plate for application to the base of a rail comprising a body portion on which the rail rests, two parallel abutments extending upwardly therefrom and between which the base of the rail is disposed, one of said abutments being spaced from the juxtaposed edge of the rail base and being constructed with a beveled face to form a dovetailed groove therebetween, a key having a dovetailed tongue received in said groove, the minimum distance between said face and the juxtaposed edge of the rail base being less than the maximum thickness of said tongue to prevent disengagement of the tongue therefrom upon upward movement of the key, a longitudinally extending groove in said tie plate having an inclined cam surface therein, a screw screwed into said key and engageable with said cam surface and causing upward movement of said key to grip the rail base and restrain creeping thereof in one direction upon longitudinal movement of the key in such direction, a U-shaped locking member engaging said screw from above and said key from below and restraining rotational movement of said screw.

9. A tie plate for application to the base of a rail comprising a body portion on which the rail rests, two parallel abutments extending upwardly therefrom and between which the base of the rail is disposed, one of said abutments being spaced from the juxtaposed edge of the rail base and being constructed with a beveled face to form a dovetailed groove therebetween, a key having a dovetailed tongue received in said groove, the minimum distance between said face and the juxtaposed edge of the rail base being less than the maximum thickness of said tongue to prevent disengagement of the tongue therefrom upon upward movement of the key, a longitudinally extending groove in said tie plate and having an inclined cam surface therein, a screw screwed into said key and engageable with said cam surface and causing upward movement of said key to grip the rail base and restrain creeping thereof in one direction upon longitudinal movement of the key in such direction, a flange formed on said screw, a flange formed on said key and a U-shaped locking member engaging said flanges and restraining rotation between said screw and key.

10. A tie plate for application to the base of a rail comprising a body portion on which the rail rests, two parallel abutments extending upwardly therefrom and between which the base of the rail is disposed, one of said abutments being spaced from the juxtaposed edge of the rail base and being constructed with a beveled face to form a dovetailed groove therebetween, a key having a dovetailed tongue received in said groove, the minimum distance between said face and the juxtaposed edge of the rail base being less than the maximum thickness of said tongue to prevent disengagement of the tongue therefrom upon upward movement of the key, a longitudinally extending groove in said tie plate and having an inclined cam surface therein, a screw screwed into said key and engageable with said cam surface and causing upward movement of said key to grip the rail base and restrain creeping thereof in one direction upon longitudinal movement of the key in such direction, a polygonal head on said screw, a flange on said screw at the innermost end of said head, a flange on said key, a U-shaped locking member having two spaced legs, a polygonal hole in one of said legs fitting over said head, one of said legs engaging the flange on said screw, and the other leg engaging said flange of the key to restrain rotational movement of said screw.

11. A tie plate for application to the base of a rail comprising a body portion on which the rail rests, two parallel abutments extending upwardly therefrom and between which the base of the rail is disposed, one of said abutments being spaced from the juxtaposed edge of the rail base and being constructed with a beveled face to form a dovetailed groove therebetween, a key having a dovetailed tongue received in said groove, the minimum distance between said face and the juxtaposed edge of the rail base being less than the maximum thickness of said tongue to prevent disengagement of the tongue therefrom upon upward movement of the key, a longitudinal groove in the abutment having the beveled face, said groove having a longitudinally inclined cam surface therein, a flange on said key overlying said denoted abutment, a screw screwed in said flange and engageable with said cam surface and causing upward movement of said key to grip the rail base and restrain creeping thereof in one direction upon longitudinal movement of the key in such direction.

12. A tie plate for application to the base of a rail comprising a body portion on which the rail rests, two parallel abutments extending upwardly therefrom and between which the base of the rail is disposed, one of said abutments being spaced from the juxtaposed edge of the rail base and being constructed with a beveled face to form a dovetailed groove therebetween, a key having a dovetailed tongue received in said groove, the minimum distance between said face and the juxtaposed edge of the rail base being less than the maximum thickness of said tongue to prevent disengagement of the tongue therefrom upon upward movement of the key, a longitudinally extending groove in said tie plate and having a cam surface at the bottom thereof inclined in a longitudinal direction, a screw screwed into said key and engageable with said cam surface and end walls at the ends of said groove for limiting the movement of said key relative to said tie plate.

13. A tie plate for application to the base of a rail comprising a body portion on which the rail rests, two parallel abutments extending upwardly therefrom and between which the base of the rail is disposed, one of said abutments being spaced from the juxtaposed edge of the rail base and being constructed with a beveled face to form a dovetailed groove therebetween, a key having a dovetailed tongue received in said groove, the minimum distance between said face and the juxtaposed edge of the rail base being less than the maximum thickness of said tongue to prevent disengagement of the tongue therefrom upon upward movement of the key, said key and tie plate having engageable parts, a longitudinally extending cam surface on one of said parts inclining in the direction of its length, a cam follower on the other of said parts engageable with said cam surface, said key and tie plate having other juxtaposed parts spaced from the first named parts, a longitudinally extending inclined cam surface on one of said second named parts inclining in the direction of its length and parallel to said first named cam surface, a cam follower on the other part engageable therewith, said cams and followers causing upward movement of the key in parallelism with the base to grip the rail base and restrain creeping thereof in one direction upon longitudinal movement of the key in such direction.

14. A tie plate for application to the base of a rail comprising a body portion on which the rail rests, two parallel abutments extending upwardly therefrom and between which the base of the rail is disposed, one of said abutments being spaced from the juxtaposed edge of the rail base and being constructed with a beveled face to form a dovetailed groove therebetween, a key having a dovetailed tongue received in said groove, the minimum distance between said face and the juxtaposed edge of the rail base being less than the maximum thickness of said tongue to prevent disengagement of the tongue therefrom upon upward movement of the key, said key and tie plate having juxtaposed parts, a longitudinally extending inclined cam surface on one of said parts, a cam follower on the other of said parts engageable with said cam surface, said key and tie plate having other juxtaposed parts spaced from the first named parts, a longitudinally extending inclined cam surface on one of said second named parts and parallel to said first named cam surface, a cam follower on the other part engageable therewith, said cams and followers causing upward movement of the key in parallelism with the base to grip the rail base and restrain creeping thereof in one direction upon longitudinal movement of the key in such direction, and third and fourth cams and followers acting between said key and tie plate similar to said first and second cams and followers and inclining in the opposite direction, said last named cams and followers causing upward movement of the key in parallelism with the base to grip the rail base and restrain creeping thereof in the opposite direction upon longitudinal movement of the key in such direction.

15. A tie plate for application to the base of a rail comprising a body portion on which the rail rests, two parallel abutments extending upwardly therefrom and between which the base of the rail is disposed, one of said abutments being spaced from the juxtaposed edge of the rail base and being constructed with a beveled face to form a dovetailed groove therebetween, a key having a dovetailed tongue received in said groove, the minimum distance between said face and the juxtaposed edge of the rail base being less than the maximum thickness of said tongue to prevent disengagement of the tongue therefrom upon upward movement of the key, said key having an extension at one end overhanging the tie plate and formed with an inclined longitudinally extending cam surface on the underside thereof and a cam follower on said abutment engageable therewith and causing upward movement of said key to grip the rail base and restrain creeping thereof in one direction upon longitudinal movement of the key in such direction.

16. A tie plate for application to the base of a rail comprising a body portion on which the rail rests, two parallel abutments extending upwardly therefrom and between which the base of the rail is disposed, one of said abutments being spaced from the juxtaposed edge of the rail base and being constructed with a beveled face to form a dovetailed groove therebetween, a key having a dovetailed tongue received in said groove, the minimum distance between said face and the juxtaposed edge of the rail base being less than the maximum thickness of said tongue to prevent disengagement of the tongue therefrom upon upward movement of the key, said key having an extension at one end overhanging the tie plate and formed with an inclined longitudinally extending cam surface on the underside thereof and a cam follower on said abutment having a correspondingly inclined surface engageable therewith and causing upward movement of said key to grip the rail base and restrain creeping thereof in one direction upon longitudinal movement of the key in such direction.

17. A tie plate for application to the base of a rail comprising a body portion on which the rail rests, two parallel abutments extending upwardly therefrom and between which the base of the rail is disposed, one of said abutments being spaced from the juxtaposed edge of the rail base and being constructed with a beveled face to form a dovetailed groove therebetween, a key having a dovetailed tongue received in said groove, the minimum distance between said face and the juxtaposed edge of the rail base being less than the maximum thickness of said tongue to prevent disengagement of the tongue therefrom upon upward movement of the key, said key having extensions at its ends overhanging the tie plate and formed with oppositely inclined longitudinally extending cam surfaces on the undersides thereof and cam followers on the ends of said abutment engageable therewith and causing upward movement of said key to grip the rail base and restrain creeping of the rail in either direction upon movement of the key in either direction.

18. A tie plate for application to the base of a rail comprising a body portion on which the rail rests, two parallel abutments extending upwardly therefrom and between which the base of the rail is disposed, one of said abutments being spaced from the juxtaposed edge of the rail base and being constructed with a beveled face to form a dovetailed groove therebetween, a key having a dovetailed tongue received in said groove, the minimum distance between said face and the juxtaposed edge of the rail base being less than the maximum thickness of said tongue to prevent disengagement of the tongue therefrom upon upward movement of the key, a longitudinally extending groove in said tie plate and having a longitudinally inclined cam surface therein and a screw screwed into said key and movable therewith, said screw having an end engageable with said cam surface and causing upward movement of said key to grip the rail base and restrain creeping thereof in one direction upon longitudinal movement of the key in such direction said key having a tapered end for directing said key into said dovetailed slot.

19. A tie plate for application to the base of a rail comprising a body portion on which the rail rests, two parallel abutments extending upwardly therefrom and between which the base of the rail is disposed, one of said abutments being spaced from the juxtaposed edge of the rail base and being constructed with a beveled face to form a dovetailed groove therebetween, a key having a dovetailed tongue received in said groove, the minimum distance between said face and the juxtaposed edge of the rail base being less than the maximum thickness of said tongue to prevent disengagement of the tongue therefrom upon upward movement of the key, a longitudinally extending groove in said tie plate and having two oppositely directed longitudinally extending inclined cam surfaces therein and a screw screwed into said key and being alternately engageable with said cam surfaces to cause upward movement of said key upon longitudinal movement of the key in either direction to grip the rail base and restrain creeping thereof in the corresponding direction of movement, extensions on said key inclining downwardly from the ends of said key to form additional cam surfaces engaging said tie plate and operating in conjunction with said first named surfaces to cause said key to move upwardly in parallelism to said tie plate upon endwise movement thereof.

20. A tie plate for application to the base of a rail comprising a body portion on which the rail rests, two parallel abutments extending upwardly therefrom and between which the base of the rail is disposed, one of said abutments being spaced from the juxtaposed edge of the rail base and being constructed with a beveled face to form a dovetailed groove therebetween, a key having a dovetailed tongue received in said groove, the minimum distance between said face and the juxtaposed edge of the rail base being less than the maximum thickness of said tongue to prevent disengagement of the tongue therefrom upon upward movement of the key, a longitudinally extending groove in the abutment forming said dovetailed slot and having a longitudinally inclined cam surface therein, a flange overlying said abutment and the slot therein, a screw screwed into said flange and engageable with said cam surface and causing upward movement of said key to grip the rail base and restrain creeping thereof in one direction upon longitudinal movement of the key in such direction.

21. A tie plate for application to the base of a rail comprising a body portion on which the rail rests, two parallel abutments extending upwardly therefrom and between which the base of the rail is disposed, one of said abutments being spaced from the juxtaposed edge of the rail base and being constructed with a beveled face to form a dovetailed groove therebetween, a key having a dovetailed tongue received in said groove, the minimum distance between said face and the juxtaposed edge of the rail base being less than the maximum thickness of said tongue to prevent disengagement of the tongue therefrom upon upward movement of the key, a longitudinally extending groove in said tie plate and having a longitudinally inclined cam surface therein, a screw screwed into said key and a shoe on said screw and engageable with said cam surface and causing upward movement of said key to grip the rail base and restrain creeping thereof in one direction upon longitudinal movement of the key in such direction.

22. A tie plate for application to the base of a rail comprising a body portion on which the rail rests, two parallel abutments extending upwardly therefrom and between which the base of the rail is disposed, one of said abutments being spaced from the juxtaposed edge of the rail base and being constructed with a beveled face to form a dovetailed groove therebetween, a key having a dovetailed tongue received in said groove, the minimum distance between said face and the juxtaposed edge of the rail base being less than the maximum thickness of said tongue to prevent disengagement of the tongue therefrom upon upward movement of the key, a longitudinally extending groove in said tie plate and having an inclined cam surface therein and a screw screwed into said key and engageable with said cam surface and causing upward movement of said key to grip the rail base and restrain creeping thereof in one direction upon longitudinal movement of the key in such direction said key having a flange extending above the abutment forming the dovetailed slot, an extension on said flange projecting beyond said tie plate, said extension having an inclined surface engaging said tie plate and urging upward movement of said key upon longitudinal movement of said key in one direction.

23. A tie plate for application to the base of a rail comprising a body portion on which the rail rests, two parallel abutments extending upwardly therefrom and between which the base of the rail is disposed, one of said abutments being spaced from the juxtaposed edge of the rail base and being constructed with a beveled face to form a dovetailed groove therebetween, a key having a dovetailed tongue received in said groove, the minimum distance between said face and the juxtaposed edge of the rail base being less than the maximum thickness of said tongue to prevent disengagement of the tongue therefrom upon upward movement of the key, extensions on the ends of said key projecting outwardly beyond said tie plate, said extensions having longitudinal oppositely extending cam surfaces, cam followers on said tie plate for engagement therewith and causing upward movement of said key to resist creeping of the rail in either direction upon longitudinal movement of said key in either direction.

24. A tie plate for application to the base of a rail comprising a body portion on which the rail rests, two parallel abutments extending upwardly therefrom and between which the base of the rail is disposed, one of said abutments being spaced from the juxtaposed edge of the rail base and being constructed with a beveled face to form a dovetailed groove therebetween, a key having a dovetailed tongue received in said groove, the minimum distance between said face and the juxtaposed edge of the rail base being less than the maximum thickness of said tongue to prevent disengagement of the tongue therefrom upon upward movement of the key, a longitudinally extending groove in said tie plate and having an inclined cam surface therein and a screw screwed into said key and engageable with said cam surface and causing upward movement of said key to grip the rail base and restrain creeping thereof in one direction upon longitudinal movement of the key in such direction said key having a flange extending above the abutment forming the dovetailed slot, an extension on said flange projecting beyond said tie plate, said extension having an inclined surface engaging said tie plate and urging upward movement of said key upon longitudinal movement of said key in one direction said extension having parts extending below the uppermost portions of the tie plate and preventing disengagement of the key from said dovetailed slot.

25. A tie plate for application to the base of a rail comprising a body portion on which the rail rests, two parallel abutments extending upwardly therefrom and between which the base of the rail is disposed, one of said abutments being spaced from the juxtaposed edge of the rail base and being constructed with a beveled face to form a dovetailed groove therebetween, a key having a dovetailed tongue received in said groove, the minimum distance between said face and the juxtaposed edge of the rail base being less than the maximum thickness of said tongue to prevent disengagement of the tongue therefrom upon upward movement of the key, a longitudinally extending groove in said tie plate and having an inclined cam surface therein and a screw screwed into said key and engageable with said cam surface and causing upward movement of said key to grip the rail base and restrain creeping thereof in one direction upon longitudinal movement of the key in such direction said key having a flange extending above the abutment forming the dovetailed slot, an extension on said flange projecting beyond said tie plate said flange being separated for a portion of its length from said key by means of a kerf, the separated portion of said flange and extension having an inclined under surface for engagement with the tie plate and urging upward movement of said key upon longitudinal movement of said key in one direction.

References Cited in the file of this patent

UNITED STATES PATENTS

| 1,055,107 | Welday | Mar. 4, 1913 |
| 1,107,085 | McDermott | Aug. 11, 1914 |
| 1,121,215 | Wieder | Dec. 15, 1914 |
| 2,133,317 | Anthonisen | Oct. 18, 1938 |